US007476351B2

(12) United States Patent
Nilsson et al.

(10) Patent No.: US 7,476,351 B2
(45) Date of Patent: Jan. 13, 2009

(54) PROCESS FOR THE MANUFACTURE OF SURFACE ELEMENTS

(75) Inventors: Magnus N. Nilsson, Trelleborg (SE); Lars Ohlsson, Höllviken (SE); Magdalena Christiansson, Trelleborg (SE); Krister Hansson, Trelleborg (SE); Jan Ericsson, Helsingborg (SE)

(73) Assignee: Pergo (Europe) AB, Trelleborg (SE)

( * ) Notice: Subject to any disclaimer, the term of this patent is extended or adjusted under 35 U.S.C. 154(b) by 1380 days.

(21) Appl. No.: 09/964,838

(22) Filed: Sep. 28, 2001

(65) Prior Publication Data

US 2002/0038924 A1 Apr. 4, 2002

(30) Foreign Application Priority Data

Oct. 3, 2000 (SE) .................................... 0003550

(51) Int. Cl.
*B29C 59/04* (2006.01)

(52) U.S. Cl. ...................................... 264/129; 264/319

(58) Field of Classification Search ..................... 101/4, 101/5, 22; 264/129, 319
See application file for complete search history.

(56) References Cited

U.S. PATENT DOCUMENTS

| | | | | |
|---|---|---|---|---|
| 3,196,030 | A * | 7/1965 | Petry | 427/264 |
| 3,808,024 | A * | 4/1974 | Witman | 428/187 |
| 4,092,198 | A * | 5/1978 | Scher et al. | 156/222 |
| 4,216,251 | A * | 8/1980 | Nishimura et al. | 427/370 |
| 4,318,950 | A * | 3/1982 | Takashi et al. | 428/143 |
| 4,384,904 | A * | 5/1983 | Kauffman et al. | 156/78 |
| 5,344,692 | A * | 9/1994 | Schmoock | 428/161 |
| 5,498,309 | A * | 3/1996 | Greten et al. | 156/347 |
| 5,720,913 | A * | 2/1998 | Andersen et al. | 264/108 |
| 5,804,116 | A * | 9/1998 | Schmid et al. | 264/104 |
| 5,961,903 | A * | 10/1999 | Eby et al. | 264/46.5 |
| 6,106,654 | A | 8/2000 | Velin et al. | |
| 6,238,750 | B1 * | 5/2001 | Correll et al. | 427/521 |
| 6,354,915 | B1 * | 3/2002 | James et al. | 451/41 |
| 6,399,670 | B1 * | 6/2002 | MacQueen et al. | 522/64 |
| 6,465,046 | B1 * | 10/2002 | Hansson et al. | 427/256 |
| 6,565,919 | B1 * | 5/2003 | Hansson et al. | 427/203 |
| 6,685,993 | B1 * | 2/2004 | Hansson et al. | 427/551 |
| 2003/0207083 | A1 * | 11/2003 | Hansson et al. | 428/143 |

FOREIGN PATENT DOCUMENTS

| | | |
|---|---|---|
| DE | 19845496 | 4/2000 |
| EP | 0106707 | 4/1984 |
| WO | 9317182 | 9/1993 |
| WO | 9700172 | 1/1997 |
| WO | 9731776 | 9/1997 |

OTHER PUBLICATIONS

"Lacquer", "Resin". *Hackh's Chemical Dictionary*. 1969.*

WPI, Derwent Accession No. 1974-60732V, Danya Sangyo KK: "Thermosetting decorative board mfr—with convex and concave patterns".

WPI, Derwent Accession No. 1994-097440, Toppan Printing Co. Ltd.: "Producing embossed sheet, useful as building material—by applying radioactive ray curable resin on base sheet, prer-curing, and then embossing-curing by irradiating electron beam".

Patent Abstracts of Japan, vol. 18, M-1610 abstract of JP 60-47883 A (Toppan Printing Co Ltd), Feb. 22, 1994.

WPI, Derwent Accession No. 1994-097387, Toppan Printing Co Ltd.: "Embossing moulding process reducing air bubbles—in which ionising radiation curable type resin is coated onto surface of base sheet, etc.".

Patent Abstracts of Japan, vol. 18, M-1610 abstract of JP 60-47806 A (Toppan Printing Co. Ltd.), Feb. 22, 1994.

WPI, Derwent Accession No. 1994-205294, Toppan Printing Co. Ltd.: Embossed decorative board prodn.—involves contacting embossing roll with resin-coated baseboard then irradiating with ionising radiation.

Patent Abstracts of Japan, vol. 18, c-1242 Abstract of Jp 61-42603 A (Toppan Printing Co. Ltd.), May 24, 1994.

WPI, Derwent Accession No. 1994-114876, Toppan Printing Co. Ltd.: Prepn. Of embossed decorative sheet with good design effect—by heating electron beam curable resin, applying to base sheet, cooling, pressing against hot embossing roll and applying electron beam.

Patent Abstracts of Japan, vol. 18, M-1619 abstract of JP 60-64129 A (Toppan Printing Co. Ltd.), Mar. 8, 1994.

WPI, Derwent Accessin No. 1995-307845, Yamaha Corp.: "Decorative wood plate—comprises (semi)transparent coating film of synthetic resin material formed on surface of decorative wood base".

Patent Abstracts of Japan, No. 11 abstract of JP 72-5109 A (Yamaha Corp.), Aug. 8, 1995.

* cited by examiner

*Primary Examiner*—Monica A Huson
(74) *Attorney, Agent, or Firm*—Novak, Druce + Quigg L.L.P.

(57) ABSTRACT

A process for the manufacture of a decorative surface element, which element comprises a base layer, a decor and a wear layer of a UV or electron beam curing lacquer. One or more structured surfaces, forming embossing surfaces of one or more rollers or moulds, are positioned on top of the decorative lacquered surface, possibly after having cured the lacquer to a desired viscosity, and are continuously or discontinuously pressed on to this. The lacquer will be provided with a surface structure which enhances the decorative effect of the decor. The wear layer is then completely cured.

12 Claims, No Drawings

PROCESS FOR THE MANUFACTURE OF SURFACE ELEMENTS

The present invention relates to a process for the manufacture of decorative surface elements with a surface structure matching the decor of the upper surface.

Products coated with simulated versions of materials such as wood and marble are frequent today. They are foremost used where a less expensive material is desired, but also where resistance towards abrasion, indentation and different chemicals and moisture is required. As an example of such products floors, floor beadings, table tops, work tops and wall panels can be mentioned.

As an example of an existing product can be mentioned the thermosetting laminate which mostly consists of a number of base sheets with a decor sheet placed closest to the surface. The decor sheet can be provided with a desired decor or pattern. Frequently used patterns usually represent the image of different kinds of wood or minerals such as marble or granite. The surface of the laminate can, at the laminating procedure, be provided with a structure, which will make the decor more realistic. Press plates with structure or structure foils are here frequently used during the pressing of the laminate. A negative reproduction of the structure in the press plate or the foil will be embossed into the laminate surface during the laminating procedure.

The structure suitably represents features characteristic for the pattern the decor represents. The structure can be made coarse to simulate for example rough planed stone, or smooth with randomly placed pits and micro cracks to simulate polished marble. When the surface of wood is simulated the surface is provided with randomly placed thin oblong indentations which imitate pores.

It has for a long time been a great need to be able to manufacture simulated materials where a lacquer is used as a top coat on a decor. The only way, so far, to achieve a surface structure in lacquer is casting or abrasive moulding which both are time consuming and expensive processes.

According to the present invention the above mentioned needs have been met and a surface element with a decorative surface with a surface structure has been achieved. The invention relates to a process for the manufacture of a decorative surface element. The element comprises a base layer, a decor and a wear layer of a UV or electron beam curing lacquer. The invention is characterised in that one or more structured surfaces forming embossing surfaces of or more rollers or moulds are positioned on top of the decorative lacquered surface, possibly after having cured the lacquer to a desired viscosity, and are continuously or discontinuously pressed on to this. The lacquer will hereby be provided with a surface structure which enhances the decorative effect of the decor. The wear layer is then completely cured. The lacquer preferably consists of a UV-curing or electron beam curing acrylic or maleamide lacquer. The wear layer is preferably applied in several steps with intermediate partial curing. The wear layer preferably also includes hard particles with an average particle size in the range 50 nm-150 μm. The base layer may suitably consist of a particle board or a fibre board but may also be made of a material which mainly consist of a polymer such as polyurethane.

In order to make the structuring process run smoother, the surface element preferably contains a layer which is elastic at least before the complete curing. The elastic layer is selected from the group consisting of; the base layer, a primer layer, the decor layer and the wear layer.

The structuring process will most often result in undesirable raised sections in the surface. These sections can be planed out by pressing one or more glazing rollers towards the surface structured wear layer before the complete curing stage.

The structured rollers are preferably heated to a surface temperature above 40° C., preferably in the range 50° C.-150° C. This will minimise the risk for forming of cracks. The glazing rollers are preferably also heated to a surface temperature above 30° C., preferably in the range 35° C.-100° C. for the same reason.

According to an alternative embodiment of the invention the structuring is achieved by means of a mould. The structured surface of the mould is heated to a surface temperature above 40° C., preferably in the range 50° C.-150° C. The pressure exercised by the structured mould surface is 50-200 Bar, preferably 65-100 Bar.

The glazing process will result in a surface which is easier to clean. It is also possible to achieve such a surface by applying a thin top coat on top of the structured wear layer. Such a thin top coat may of course be applied on top of the structured wear layer after the glazing stage as well. A thin top coat may advantageously also be applied on top of the structured wear layer before the glazing stage. The top coat is then partially cured before the glazing. The top coat is suitably comprised of acrylic or maleamide lacquer and does possibly have an additive in the form of hard particles with an average particle size in the range 50 nm-10 μm.

Each structured roller is provided with a counter stay roller between which the surface element is passed. Each glazing roller is preferably also provided with a counter stay roller between which the surface element is passed. The surface element has a thickness T and the distance between each structured roller and corresponding counter stay is preferably set in the range T minus 0.5 mm to 1.2 mm, preferably 0.7 mm-0.9 mm. The pressure between each structured roller and its corresponding counter stay is then 50-200 Bar, preferably 65-100 Bar.

The surface element has a thickness T and that the distance between each glazing roller and corresponding counter stay is set in the range T minus 0.7 mm-1.2 mm, preferably 0.7 mm-0.9 mm. The pressure between each glazing roller and its corresponding counter stay is suitably in the range 0.1-10 Bar, preferably 0.5-5 Bar.

The hard particles added to the lacquer consists of for example silicon oxide, α-aluminium oxide or silicon carbide. According to one embodiment of the invention the main part of the hard particles consists of for example silicon oxide, α-aluminium oxide or silicon carbide while a smaller amount of the hard particles consist of diamond. The hard particles consisting of diamond is then in the average particle size range 50 nm-2 μm and is placed close to the upper surface of the wear layer.

The rollers may, when more than one structured roller is used, be provided with different surface structures. This will make it possible to achieve a surface structure with a variation that corresponds to the visible decor.

The invention claimed is:

1. A process for the manufacture of a decorative surface element, which element comprises a base layer, a décor and a wear layer of a UV or electron beam curing lacquer, said process comprising the steps of:

positioning one or more structured rollers or molds on top of the lacquer, the one or more rollers or molds provided with embossing surfaces, pressing said one or more rollers or molds into said lacquer, whereby the lacquer will be provided with a surface structure, thereby enhancing the decorative effect of the décor, and thereafter completely curing the wear layer by applying a UV or electron beam, wherein one or more glazing rollers is pressed towards the surface structured wear layer before the complete curing stage.

2. A process according to claim 1, wherein the structured rollers are heated to a surface temperature (ST) above 40° C.

3. A process according to claim 1, wherein the glazing rollers are heated to a surface temperature (ST) above 30° C.

4. A process according to claim 1, wherein a thin top coat is applied on top of the structured wear layer after the glazing stage.

5. A process according to claim 1, wherein a thin top coat is applied on top of the structured wear layer before the glazing stage and that the top coat is partially cured before the glazing.

6. A process according to claim 1, wherein each glazing roller is provided with a counter stay roller between which the surface element is passed.

7. A process according to claim 6, wherein the surface element has a thickness T and that the distance between each glazing roller and corresponding counter stay is set in the range T minus 0.7 mm-1.2 mm.

8. A process according to claim 7, wherein the pressure between each glazing roller and its corresponding counter stay is 0.1-10 Bar.

9. The process according to claim 7, wherein the distance between each structured roller and corresponding counter stay is in the range T minus 0.7 mm-0.9 mm.

10. The process according to claim 7, wherein the pressure between each glazing roller and its corresponding counter stay (P) is 65-100 Bar.

11. The process according to claim 2, wherein the structured rollers are heated to a surface temperature (ST) in the range of 50° C.-150° C.

12. A process according to claim 3, wherein the glazing rollers are heated to a surface temperature (ST) in the range of 35° C.-100° C.

* * * * *